US012076869B2

(12) United States Patent
Landi et al.

(10) Patent No.: US 12,076,869 B2
(45) Date of Patent: Sep. 3, 2024

(54) EFFECTIVE CALCULATION METHOD OF THE MINIMUM DISTANCE TO DYNAMIC OBJECTS

(71) Applicant: FANUC CORPORATION, Yamanashi (JP)

(72) Inventors: Chiara Landi, Reggio Emilia (IT); Hsien-Chung Lin, Fremont, CA (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 446 days.

(21) Appl. No.: 17/456,771

(22) Filed: Nov. 29, 2021

(65) Prior Publication Data

US 2023/0166406 A1 Jun. 1, 2023

(51) Int. Cl.
*B25J 9/16* (2006.01)
*B25J 13/08* (2006.01)
(Continued)

(52) U.S. Cl.
CPC .......... *B25J 9/1697* (2013.01); *B25J 9/1607* (2013.01); *B25J 9/1666* (2013.01); *B25J 13/089* (2013.01);
(Continued)

(58) Field of Classification Search
CPC ...... B25J 13/089; B25J 9/1666; B25J 9/1697; G05B 2219/39091; G05B 2219/40202;
(Continued)

(56) References Cited

U.S. PATENT DOCUMENTS

2019/0007659 A1\* 1/2019 Neubauer .............. G01B 11/14
2022/0371200 A1\* 11/2022 Yu ............................. G06T 7/60

FOREIGN PATENT DOCUMENTS

CN 110378937 B \* 5/2021 ............ B25J 9/1674

OTHER PUBLICATIONS

Fabrizio, F., & De Luca, A. (2016). Real-time computation of distance to dynamic obstacles with multiple depth sensors. IEEE Robotics and Automation Letters, 2(1), 56-63. (Year: 2016).\*

(Continued)

*Primary Examiner* — Andrae S Allison
*Assistant Examiner* — Emmanuel Silva-Avina
(74) *Attorney, Agent, or Firm* — John A. Miller; Shumaker, Loop & Kendrick, LLP (57) ABSTRACT

A method and system for calculating a minimum distance from a robot to dynamic objects in a robot workspace. The method uses images from one or more three-dimensional cameras, where edges of objects are detected in each image, and the robot and the background are subtracted from the resultant image, leaving only object edge pixels. Depth values are then overlaid on the object edge pixels, and distance calculations are performed only between the edge pixels and control points on the robot arms. Two or more cameras may be used to resolve object occlusion, where each camera's minimum distance is computed independently and the maximum of the cameras' minimum distances is used as the actual result. The use of multiple cameras does not significantly increase computational load, and does require calibration of the cameras with respect to each other.

20 Claims, 8 Drawing Sheets

(51) Int. Cl.
*G06T 7/00* (2017.01)
*G06T 7/13* (2017.01)
*G06T 7/50* (2017.01)

(52) U.S. Cl.
CPC ............. *G06T 7/0004* (2013.01); *G06T 7/13* (2017.01); *G06T 7/50* (2017.01); *G06T 2207/20024* (2013.01); *G06T 2207/20192* (2013.01); *G06T 2207/20224* (2013.01); *G06T 2207/30196* (2013.01)

(58) Field of Classification Search
CPC . G06T 2207/10028; G06T 2207/20024; G06T 7/13; G06T 7/12; G06T 7/50; G06T 2207/10024; G06T 2207/10021; G06T 7/55; G06T 2207/20224; G06T 2207/20036; G06T 2207/20041; G06T 2207/10016
USPC .......................................................... 382/153
See application file for complete search history.

(56) References Cited

OTHER PUBLICATIONS

Flacco, F., Kroeger, T., De Luca, A., & Khatib, O. (2015). A depth space approach for evaluating distance to objects: with application to human-robot collision avoidance. Journal of Intelligent & Robotic Systems, 80, 7-22. (Year: 2015).*

Sabetian, Saba. Self-collision detection and avoidance for Dual-Arm Concentric Tube Robots (2019). Institute of Biomaterials and Biomedical Engineering, University of Toronto (Year: 2019).*

Mao, Y., Cheung, G., Ortega, A., & Ji, Y. (May, 2013). Expansion hole filling in depth-image-based rendering using graph-based interpolation. In 2013 IEEE International Conference on Acoustics, Speech and Signal Processing (pp. 1859-1863). IEEE. (Year: 2013).*

Fabrizio Flacco et al. "A Depth Space Approach for Evaluating Distance to Objects" J Intell Robot Syst, 2015, pp. S7-S22.

Fabrizio Flacco et al. "Real-Time Computation of Distance To Dynamic Obstacles With Multiple Depth Sensors" EEE Robotics and Automation Letters, Jan. 2017, pp. 56-63, vol. 2, No. 1.

* cited by examiner

EFFECTIVE CALCULATION METHOD OF THE MINIMUM DISTANCE TO DYNAMIC OBJECTS

BACKGROUND

Field

The present disclosure relates to the field of object detection for industrial robot motion control and, more particularly, to a method of calculating a minimum distance between a robot and dynamic objects which are present in the robot's workspace using images from one or more three-dimensional cameras, where edges of objects are detected in each image and the robot and the background are subtracted from the resultant image, depth values are overlaid on the remaining object edge pixels, and distance calculations are performed only between the object edge pixels and control points on the robot arms.

Discussion of the Related Art

The use of industrial robots to perform a wide range of manufacturing, assembly and material movement operations is well known. In many robot workspace environments, obstacles are present and may be in the path of the robot's motion. The obstacles may be permanent structures such as machines and fixtures, which can easily be avoided by the robot due to their static nature. The obstacles may also be dynamic objects which move into or through the robot workspace at random. Dynamic objects must be accounted for in real-time calculations by the robot controller, where the robot must maneuver around the objects while performing an operation. Collisions between the robot and any obstacle must absolutely be avoided.

Prior art techniques for detecting dynamic objects based on camera images are known in the art—however, these known techniques suffer from significant limitations. One known technique uses multiple depth sensors to create point clouds defining exterior surfaces of any objects in the robot workspace, and computes a minimum distance between the points in the point clouds and the robot arms at each robot motion time step. However, because of the number of points in the point cloud, these calculations are extremely computationally intensive and slow.

Because of the inherent disadvantage of the point-cloud-based object distance technique, other techniques have been developed. A single-camera depth space approach is known, where distances between obstacle points and robot control points are calculated from a depth image. However, for obstacles which are closer to the camera than the robot, the depth extent of the obstacle is not known and the occluded space behind the obstacle is considered as occupied. This can lead to the minimum distance being dramatically underestimated, and cause unnecessary large excursions of the robot arms around an object space which is not even occupied.

In order to overcome the limitations of the single-camera depth space approach, a multi-sensor technique has been developed which is designed to solve the occlusion problem. In this method, a primary sensor is used to build a spatial depth grid, and other sensors are used to check occluded cells behind an obstacle in the depth grid. Although this method is less computationally-intensive than the point cloud approach, it can still require a long computation time for large robots having many control points and large workspaces having many cells in the depth grid. Furthermore, this method is susceptible to errors in the 3D depth grid construction, and requires precise calibration of the cameras/sensors relative to each other in order to minimize these errors.

In light of the circumstances described above, there is a need for an improved method of calculating a minimum distance between a robot and dynamic objects in the robot workspace.

SUMMARY

In accordance with the teachings of the present disclosure, a method and system for calculating a minimum distance from a robot to dynamic objects in a robot workspace are described and shown. The method uses images from one or more three-dimensional cameras, where edges of objects are detected in each image, and the robot and the background are subtracted from the resultant image, leaving only object edge pixels. Depth values are then overlaid on the object edge pixels, and distance calculations are performed only between the object edge pixels and control points on the robot arms. Two or more cameras may be used to resolve object occlusion, where each camera's minimum distance is computed independently and the maximum of the cameras' minimum distances is used as the actual result. The use of multiple cameras does not significantly increase computational load, and does require calibration of the cameras with respect to each other.

Additional features of the presently disclosed devices and methods will become apparent from the following description and appended claims, taken in conjunction with the accompanying drawings.

DETAILED DESCRIPTION OF THE EMBODIMENTS

The following discussion of the embodiments of the disclosure directed to calculating a minimum distance to dynamic objects in a robot workspace is merely exemplary in nature, and is in no way intended to limit the disclosed devices and techniques or their applications or uses.

It is well known to use industrial robots for a variety of manufacturing, assembly and material movement operations. In many robot workspace environments, obstacles are present and may at times be in the path of the robot's motion. That is, without preventive motion planning, some part of the robot may collide with or be near to some part of an obstacle when the robot moves from its current position to a destination position. The obstacles may be fixed structures such as machines, fixtures and tables, or the obstacles may be dynamic (moving) objects such as people, forklifts and other machines. Techniques have been developed in the art for computing robot motions such that the tool follows a path to the destination position while avoiding collision of the robot with any obstacle. However, in the case of dynamic objects, determining the location of the object and computing a minimum distance from the object to the robot in real time, which is necessary for collision avoidance motion planning, has always been challenging.

One technique for computing robot-object distances includes defining control points on the robot, calculating the three-dimensional (3D) coordinates of the control points based on robot pose at every time step, and computing distances from obstacle points to the robot control points. The obstacle may be defined by point clouds from sensor data, or by other techniques discussed further below.

Figure 1:
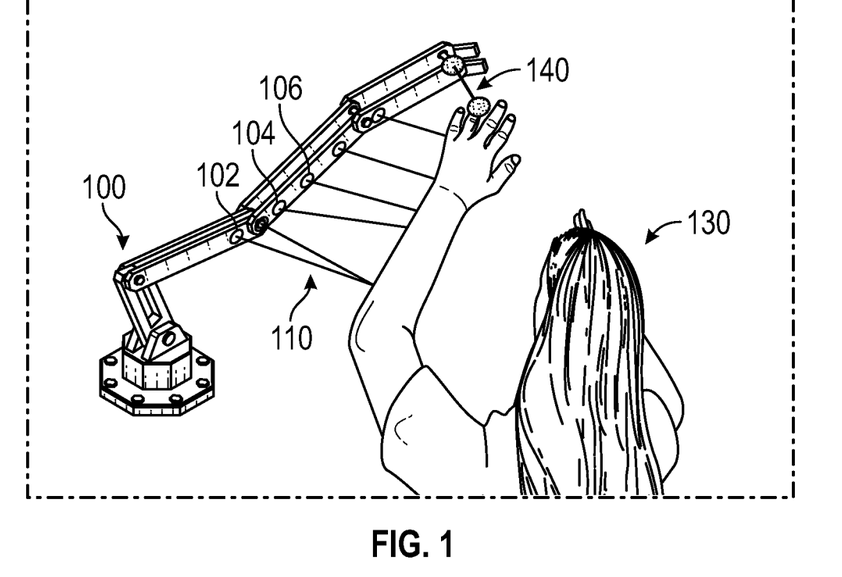
FIG. 1 is an illustration of a human occupying a workspace of an industrial robot, exemplifying the minimum distance calculation which needs to be performed in order to ensure robot-object collision avoidance.

FIG. 1 is an illustration of a human occupying a workspace of an industrial robot, exemplifying the minimum distance calculation which needs to be performed in order to ensure robot-object collision avoidance. In FIG. 1, a robot 100 is operating in a workspace. A plurality of control points (102-106, etc.) are defined on the robot 100. The control points 102-106 may be defined at key points of the robot skeleton (such as joint centers and points along arm centerlines), or they may be defined on exterior surfaces of the actual arm shapes. A human 130 occupies part of the workspace where the robot 100 is operating. The human 130 represents a dynamic object which may move into, around and out of the workspace. Determining the minimum distance between the robot 100 and the human 130 at every time step is essential for planning a collision-free robot path.

One technique for determining minimum robot-obstacle distance is to place multiple sensors around the workspace and construct a point cloud defining the obstacle from the sensor data. 3D distances from the points in the point cloud to the robot control points are then calculated. Some of these distances are shown in FIG. 1 by lines indicated at 110, from which a minimum distance is then identified. The point cloud technique can yield accurate robot-obstacle minimum distance results. However, because the obstacle point cloud typically includes many thousands of 3D points, and each point in the point cloud needs to be checked against each robot control point, the point cloud minimum distance calculations are very computationally intensive. For this reason, other minimum distance calculation methods have been developed. One problem inherent in these other methods is that an apparent minimum distance between an obstacle and a robot control point as determined from any single point of view, shown as a distance 140 in FIG. 1, may be significantly less than the actual 3D distance. This effect is discussed further below.

Figure 2:
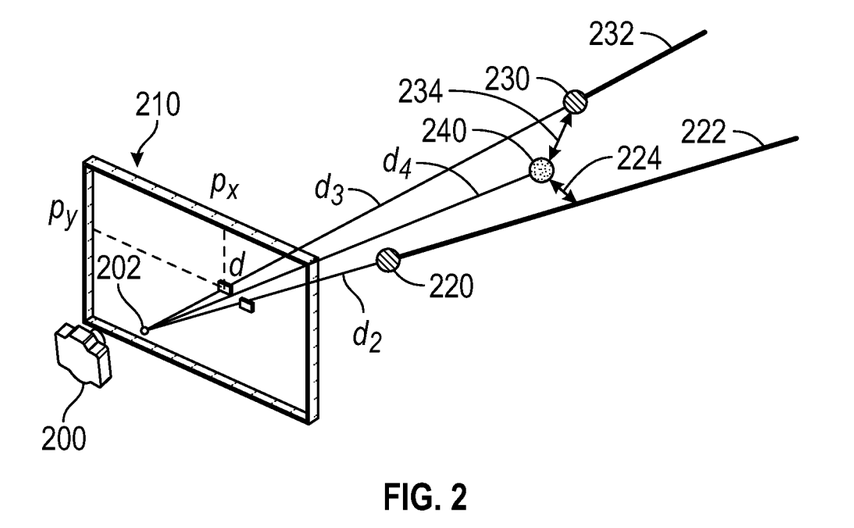
FIG. 2 is an illustration of a single-camera depth space technique for calculating a minimum distance between a robot and an object, as known in the art.

FIG. 2 is an illustration of a single-camera depth space technique for calculating a minimum distance between a robot and an object, as known in the art. A single 3D camera 200 is represented by a camera center point 202. The camera 200 has an image plane 210, where each pixel in the image plane has coordinates $(p_x, p_y)$ in image plane space. Because the camera 200 is a 3D camera, each pixel also has a depth or distance value d. Using the depth space approach depicted in FIG. 2, the camera 200 provides a continuous series of images, and each image is analyzed to detect obstacles which may require a collision avoidance maneuver by the robot. For the following discussion, consider that the camera 200 of FIG. 2 is providing images of the scene illustrated in FIG. 1.

The camera 200 in FIG. 2 detects an obstacle point 220 and an obstacle point 230. The obstacle point 220 could be a point on the arm or hand of the human 130. The obstacle point 230 could be a point on some other object in the background of FIG. 1. A control point 240 is also shown, where the control point 240 could be one of the control points 102-106 on the robot 100 of FIG. 1. The location of the control point 240, including a distance value $d_4$, can be determined from known robot kinematics and camera spatial calibration to the workspace coordinate frame. Based on a distance value $d_2$, it is known that the obstacle point 220 is much nearer the camera 200 than the control point 240. However, because the camera 200 cannot "see through" the obstacle, it is not known how much space behind the obstacle point 220 is occupied. This effect is known as occlusion. Thus, for the pixel representing the obstacle point 220, all depth values greater than the depth $d_2$ must be considered as occupied. This occupied space is illustrated by a line 222.

The 3D coordinates of the obstacle point 220 can be determined based on the corresponding pixel location in the image plane 210, camera calibration parameters, and the distance $d_2$. The 3D coordinates of the control point 240 are known, as discussed above. Thus, a distance can be computed between the obstacle point 220 and the control point 240. However, there is no assurance that computed distance would be the minimum distance between the object detected at the obstacle point 220 and the robot. Instead, because of occlusion and the possibility that any or all points along the line 222 are occupied, the worst case minimum distance between the object and the control point 240 must be calculated as the shortest distance between the control point 240 and the line 222—which is found along a line perpendicular to the line 222. This minimum distance is shown by an arrow 224; it is the distance as projected onto a plane parallel to the camera image plane 210.

The obstacle point 230 has a camera-measured distance $d_3$, which is greater than the distance $d_4$ to the control point 240. Thus, in the case of the obstacle point 230, the occluded space, shown by a line 232, does not affect the minimum distance calculation because it is beyond the control point 240. The distance from the obstacle point 230 to the control point 240 can therefore be calculated based on the actual 3D coordinates of each point (using the sum of the squares of the differences in x, y and z coordinates). The resulting distance, shown by an arrow 234, is an accurate minimum distance between the object detected at the obstacle point 230 and the control point 240 on the robot.

FIG. 2 illustrates the shortcoming of the single-camera depth space method of calculating a minimum distance between a robot and an obstacle. That is, the minimum distance of objects nearer to the camera 200 than the robot is to the camera 200 must be computed using a worst-case assumption due to occlusion. This is apparent in FIG. 2 in that the distance shown by the arrow 224 (worst-case minimum distance) is much smaller than the actual distance between the obstacle point 220 and the control point 240. Using the worst-case assumed minimum robot-obstacle distance, a robot controller will compute a path which unnecessarily causes the robot to move far out of its way to avoid the obstacle point 220.

Figure 3:
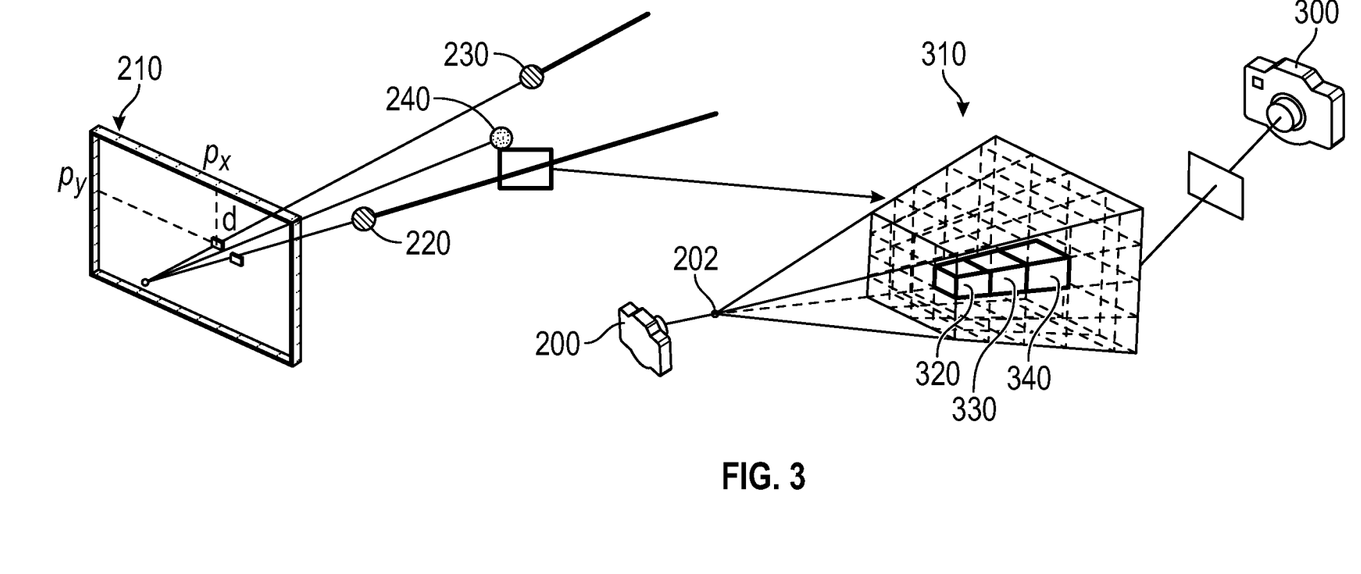
FIG. 3 is an illustration of a multi-sensor depth space technique for calculating a minimum distance between a robot and an object, as known in the art.

FIG. 3 is an illustration of a multi-sensor depth space technique for calculating a minimum distance between a robot and an object, as known in the art. The multi-sensor depth space technique illustrated in FIG. 3 was developed to overcome the shortcomings of the single-camera depth space method discussed above.

On the left side of FIG. 3, the single-camera depth space arrangement of FIG. 2 is redrawn. This includes the image plane 210, the obstacle points 220 and 230, and the control point 240, as discussed above. On the right side of FIG. 3, the multi-sensor enhancement is shown. The camera 200 (from FIG. 2) is shown at the left. The camera 200 is now the primary camera, and at least one additional camera or sensor 300 is provided. For the purposes of this discussion, this will be referred to as the camera 300, and assumed to have both image plane and distance measuring capability as described above for the camera 200.

In the multi-sensor depth space technique, a depth grid map 310 is constructed to overcome the occlusion problem by determining the actual spatial occupancy of any obstacles in the robot workspace. The depth grid map 310 is a 3D volumetric grid of tapered hexahedra emanating from the camera center point 202. Data from the camera 200 (the primary camera) is used to construct the overall cell structure of the depth grid map 310. The cell structure of the depth grid map 310 remains constant for all images from the camera 200, and the depth grid map 310 preferably covers substantially the entire working volume of the robot workspace.

For each camera image from the camera 200, obstacle points are identified as discussed above. Each obstacle point is then assigned to a corresponding occupied cell in the depth grid map 310. For example, the obstacle point 220 corresponds to an occupied cell 320 in the depth grid map 310. The cell 320 is known to be occupied based on the distance $d_2$ from the camera 200 to the obstacle point 220. In the multi-sensor depth space technique, data from the camera 300 (secondary camera/sensor) is used to determine whether cells which are "behind" occupied cells (occluded from the camera 200) are occupied by an obstacle. Cell 330 and cell 340 are "behind" the occupied cell 320 as viewed from the camera 200. Thus, data from the camera 300 is used to determine whether the cells 330 and 340 are actually occupied by the obstacle. For example, if the obstacle point 220 is on a thin object with little depth, then the cells 330 and 340 will be empty. All of the cells in the depth grid map 310 are determined to be occupied or empty in this manner.

With the occupancy of the cells in the depth grid map 310 determined, the minimum robot-obstacle distance can be computed by calculating the distance from each control point on the robot to each occupied cell in the depth grid map 310. This multi-sensor depth space technique largely overcomes the occlusion problem by using data from additional sensors. However, for large workspaces, the depth grid map 310 (which is actually much finer than illustrated in FIG. 3, based on an image with thousands of pixels) can easily contain hundreds of thousands of grid cells. The resulting minimum distance calculations to robot control points can therefore become prohibitively computationally intensive.

The present disclosure describes a technique which has been developed in order to overcome the occlusion problem of the single-camera depth space technique and the computational complexity problem of the multi-sensor depth space technique. The present disclosure describes a method for calculating a minimum distance between a robot and an object which dramatically reduces the number of points which must be evaluated, and which can be applied in either single-camera or multi-camera configurations. This method is discussed with respect to the following figures.

FIGS. 4A-4D are illustrations of a progression of images culminating in obstacle edge detection with depth information, used for calculating a minimum distance between a robot and the obstacle, according to an embodiment of the present disclosure. The image processing steps of FIGS. 4A-4D provide a basis for the disclosed efficient minimum distance calculation technique.

Figure 4A:
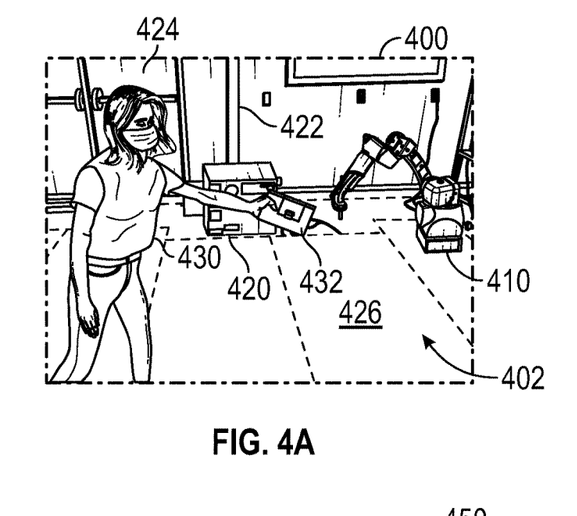
FIGS. 4A-4D are illustrations of a progression of images culminating in obstacle edge detection with depth information, used for calculating a minimum distance between a robot and the obstacle, according to an embodiment of the present disclosure.

FIG. 4A is an illustration of a camera image 400 of a robot workspace 402, before any of the disclosed processing steps. The image 400 is a digital image from a 3D camera, as known in the art and of the type discussed above. The image 400 includes a robot 410, along with background objects such as a controller 420, pipes 422, doors 424 and a floor 426. The image 400 also includes a human 430 who has entered the workspace 402 holding an object 432. The human 430 and the object 432 represent obstacles which must be detected and avoided by the robot 410.

Figure 4B:
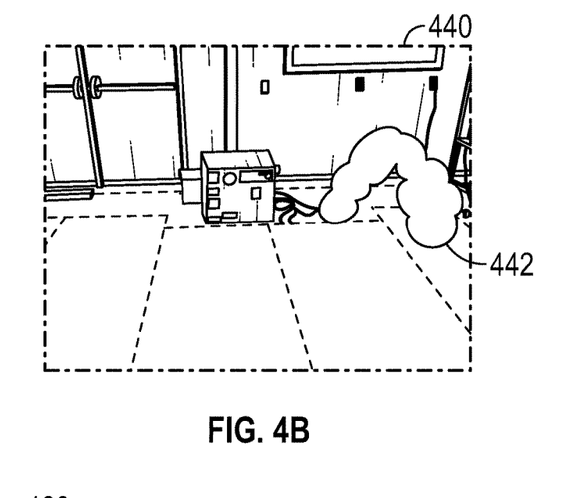

FIG. 4B is an illustration of an image 440 which has had the robot 410 "subtracted" (digitally edited out). The human 430 and the object 432 have been left out of the image 440 simply for clarity of the illustration. The robot 410 has a base which is fixed to the floor 426, and several robot arms, all of which move about the workspace 402. Using known robot arm shapes (from CAD models, or approximated using geometry primitives) and robot pose data (joint positions) which are known from the controller 420, the positions of the robot arms in the image 440 can be computed at each image time step. The pixels which are computed to contain the robot 410 are subtracted from the image 440 as shown by white space 442. Computing the position of the robot arms in the image 440 is possible as long as the camera position and pose are calibrated to the workspace coordinate frame in advance, and the robot kinematics and arm shapes are provided as stated above. Subtracting the robot 410 simplifies the image 440 for further processing by eliminating pixels which are not related to dynamic objects (obstacles).

In another embodiment, the image 400 is analyzed to detect recognizable components of the robot 410 (arms, joints, end-of-arm tool), and only those parts of the robot 410 which are visible in the image 400 are subtracted to produce the image 440. This technique avoids the unintended subtraction of portions of the dynamic objects which are located between the camera and the robot 410.

Figure 4C:
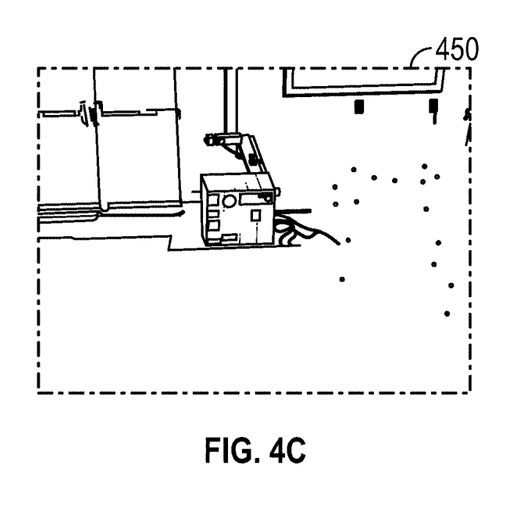

FIG. 4C is an illustration of an image 450 including only pixels of the edges of the background objects 420-426. The background objects 420-426 do not move. This fact can be used to remove the background objects 420-426 in another image processing step. An image such as the image 440

(with no obstacles), or possibly multiple images with no obstacles and the robot 400 in different positions, can be processed to detect the pixels containing the edges of the background objects 420-426. The result is stored as the image 450, which can be used for further image processing in the disclosed method.

In one embodiment of the disclosed method, edge filtering is performed on the image 400 (FIG. 4A) to produce an intermediate image containing edge pixels only, and the robot and background objects are then subtracted from the intermediate edge-only image. In other embodiments, the edge filtering step may be performed at a different point in the process, such as after robot subtraction.

Figure 4D:
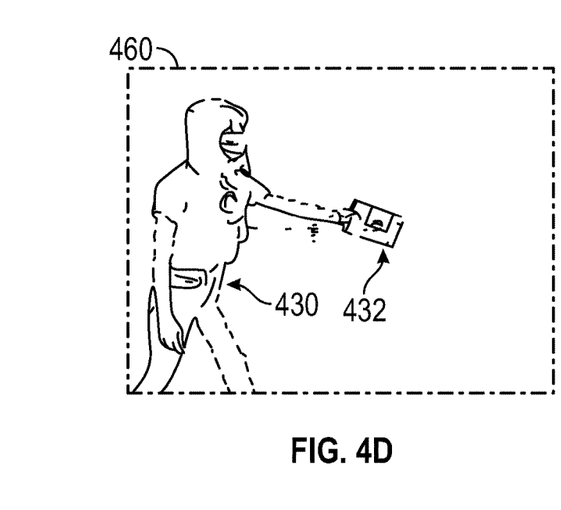

FIG. 4D is an illustration of an image 460 including only edge pixels of the human 430 and the object 432. The image 460 is produced by starting with the original image 400, performing an edge filtering to leave only edge pixels in a first processed image, then subtracting the robot (FIG. 4B) and the background object edge pixels (FIG. 4C) as discussed above to produce the image 460. The image 460 includes only edge pixels of the dynamic objects (that is, the things other than the robot and the background—i.e., potential obstacles) in the workspace 402. Each of the pixels in the image 460 has a depth value provided by the 3D camera which took the image 400. Any "holes" in the pixel depth data in the image 460 (some pixels in 3D camera images may lack depth data, often due to blocking of the depth signal around the periphery of foreground objects) can be filled using a minimum depth (from camera) value among neighboring pixels, which ensures that depth values are taken from the dynamic objects, not the background.

Based on the image processing and analysis described above, each pixel in the image 460 has x and y coordinates in an image plane and a depth value from the camera, and can therefore be represented by its 3D coordinates in the workspace coordinate frame. The 3D coordinates of the robot control points are known, as discussed earlier with respect to FIG. 2. Thus, a 3D distance can be computed between each of the pixels in the image 460 and the robot control points. However, if the pixels in the image 460 (representing the dynamic objects—the human 430 and the object 432) are nearer to the camera than the robot is, there is no assurance that 3D distance would be the minimum distance between the objects 430 and 432 and the robot. Instead, because of occlusion and the possibility that any or all points behind the objects 430 and 432 are occupied, the worst case (shortest) minimum distance between the objects 430-432 and the robot control points must be calculated as the distance projected onto a plane parallel to the camera image plane, as discussed with respect to FIG. 2. This worst case, occlusion-based distance calculation only applies if the pixels of the objects 430 and 432 have a distance from the camera that is less than the distance from the robot control points to the camera. Otherwise, the actual 3D distance calculation from each pixel to each robot control point is used.

Figure 5:
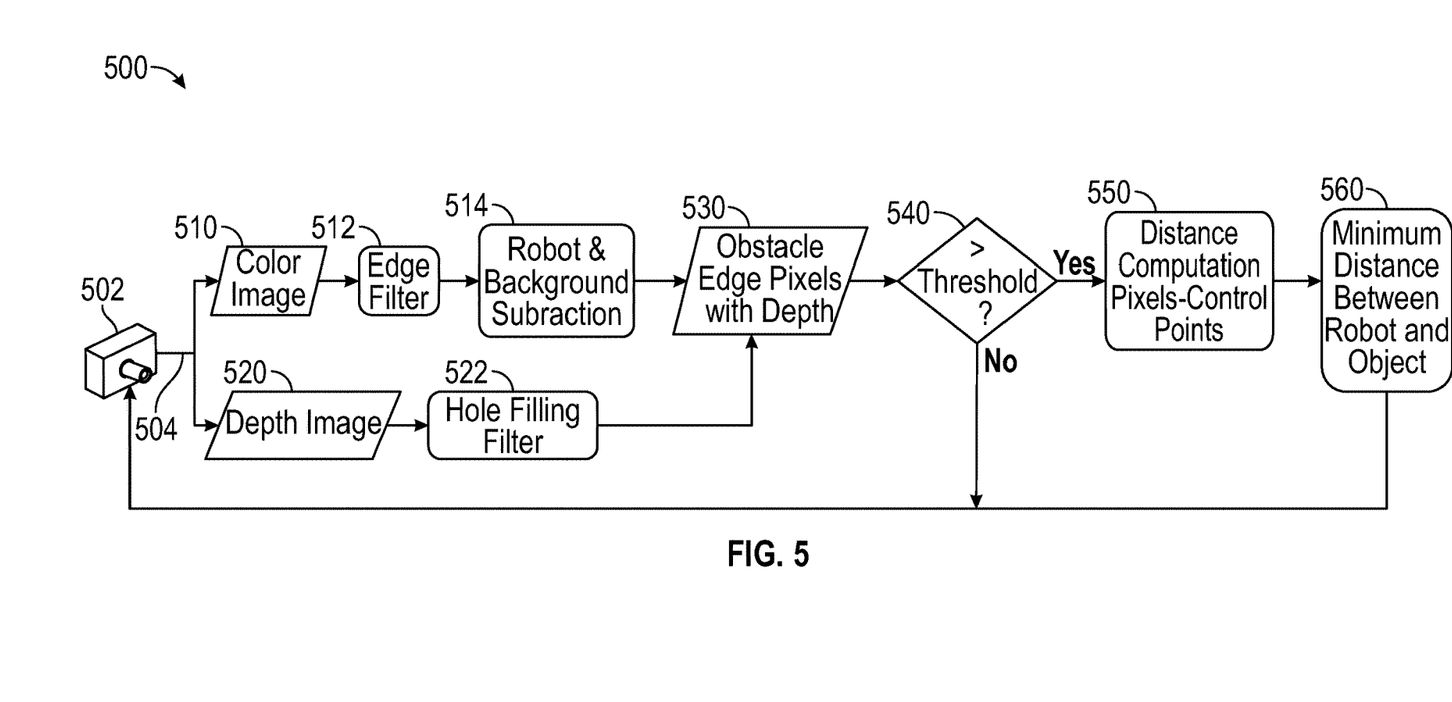
FIG. 5 is a flowchart diagram depicting a method and data flow for calculating a minimum distance between a robot and an obstacle, according to an embodiment of the present disclosure.

FIG. 5 is a flowchart diagram 500 depicting a method and data flow for calculating a minimum distance between a robot and an obstacle, according to an embodiment of the present disclosure. A 3D camera 502 is shown at the left and provides a new image at every camera time interval on line 504. The camera time interval or time step may be based on any suitable frame rate, such as in a range of 10-30 frames per second. Higher or lower frame rates may also be used. The image on the line 504 is processed in two parallel tracks—a pixel processing (upper) track using a color image 510, and a depth processing (lower) track using a depth image 520.

Using the color image 510, an edge filtering is performed at box 512 to produce an intermediate processed image. As discussed above, the edge filtering produces a version of the color image 510 which contains only edge pixels of the image contents. At box 514, robot and background subtraction are performed on the intermediate processed image to produce a final processed pixel image. The robot and background subtraction were discussed above and illustrated in FIGS. 4B and 4C, respectively. The final processed pixel image includes only the edge pixels of any dynamic objects (that is, what is left after the robot and the background are removed) which were in the color image 510. An example of the final processed image was shown in FIG. 4D.

Using the depth image 520, depth hole filling filtering is performed at box 522. The depth hole filling filter step at the box 522 provides depth values for pixels which are lacking depth data. This can be caused by a foreground object blocking the depth signal from background objects in nearby pixels. Depth data holes are filled using a minimum depth (from camera) value among neighboring pixels, which ensures that depth values are taken from the dynamic objects in the foreground, not the background objects like doors, walls, etc.

An obstacle edge pixel depth image 530 is created from the final processed pixel image after the robot and background subtraction (box 514) and the pixel depth data after the depth hole filling filtering (box 522). The obstacle edge pixel depth image 530 contains only pixels representing the edges of obstacles (dynamic objects) from the color image 510, with depth data for each pixel provided from the depth image 520. FIG. 4D, discussed earlier, was a representation of the obstacle edge pixel depth image 530.

At decision diamond 540, it is determined whether the obstacle edge pixel depth image 530 includes a quantity of pixels exceeding a predefined threshold. Even if no dynamic objects are present in a camera image, the image processing steps of FIG. 5 are likely to result in a small number of "noise" pixels in the obstacle edge pixel depth image 530. The threshold check at the decision diamond 540 is designed to make a determination as to whether any dynamic objects actually exist in the image (and in the robot workspace) or not. That is, if only a dozen or two pixels remain in the obstacle edge pixel depth image 530, then it is not likely that there is a dynamic object in the image. On the other hand, if hundreds or thousands of pixels remain in the obstacle edge pixel depth image 530 and define distinct shapes as in FIG. 4D, then this clearly represents real objects in the image. The threshold check at the decision diamond 540 can be designed in any suitable manner to distinguish between mere "noise" pixels and real objects in the image. If the threshold is not exceeded at the decision diamond 540, indicating that no dynamic objects exist in the image, then the process returns to receive the next image from the camera 502 on the line 504.

If the threshold is exceeded at the decision diamond 540, indicating that dynamic objects exist in the image, then at box 550 the distance from each pixel in the obstacle edge pixel depth image 530 to each robot control point is calculated. If the distance from the camera to the pixels in the obstacle edge pixel depth image 530 is less than the distance from the camera to the robot control points, then the calculation at the box 550 is based on the occlusion assumption discussed above. If the distance from the camera to the pixels in the obstacle edge pixel depth image 530 is greater than the distance from the camera to the robot control points, then the calculation at the box 550 is based on the actual 3D distance from the pixel coordinates to the control point coordinates.

For the non-occlusion situation (where the robot is closer to the camera than the object is to the camera), the 3D distance calculation at the box 550 is performed by first transposing each pixel in the obstacle edge pixel depth image 530 from image coordinates (x/y in image plane, plus depth) to a robot workspace coordinate frame as discussed and illustrated earlier. The coordinates of the robot control points in the workspace coordinate frame are already known from the robot pose, as also discussed earlier. The calculation of the actual 3D distance from a pixel in the obstacle edge pixel depth image 530 to a control point is then performed using the sum of the squares of the differences in coordinates in three dimensions.

For the occlusion situation (where the robot is further from the camera than the object is from the camera), the distance calculation at the box 550 is performed assuming that all space behind the pixels in the obstacle edge pixel depth image 530 is occupied by the object. Thus, the distance is calculated as the apparent distance from the pixel to the control point in a plane parallel to the camera image plane, as discussed earlier.

At box 560, the minimum distance from the dynamic objects to the robot is then provided as the smallest value of the distance calculations (for all pixels and control points) from the box 550. If the minimum distance at the box 560 is less than a threshold value, the robot controller will include the presence of the dynamic objects in the robot motion program computation to ensure collision avoidance. The robot controller may consider more data than just the single minimum distance. For example, if the minimum distance is less than the threshold, the robot controller may take into consideration, when performing the collision avoidance computation, all obstacle pixels which are within a certain distance of any point on the robot. After the minimum distance from the dynamic objects to the robot (and possibly other pixel-robot distance data) is provided at the box 560, the process returns to receive the next image from the camera 502 on the line 504.

The method of FIG. 5 may be performed on a robot controller itself such as the controller 420 of FIG. 4, or on a separate computer provided for image processing and minimum distance calculation. The controller 420 computes robot joint motion commands, as known in the art. If a separate computer is used to compute robot-obstacle minimum distances, the minimum distance vector (and possibly other pixel-robot distance data) can be provided to the robot controller at each image step, such that the controller can perform the joint motion computations including collision avoidance considerations based on the provided robot-obstacle minimum distance.

The image processing progression of FIGS. 4A-4D and the flowchart diagram 500 of FIG. 5 were both based on a single 3D camera providing images of the robot workspace. The same techniques can be applied to a multi-camera system, as discussed below.

Figure 6:
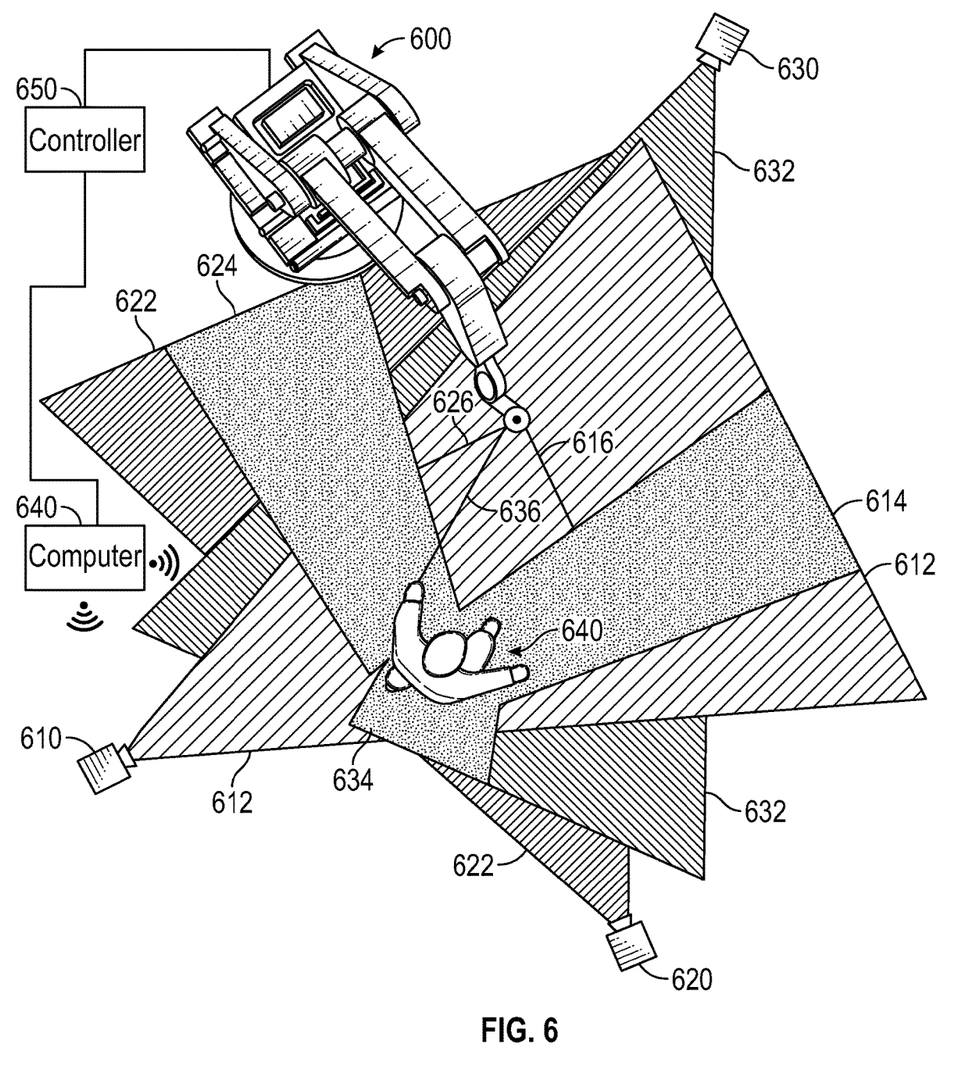
FIG. 6 is a top-view illustration of a multi-camera system for calculating a minimum distance between a robot and an obstacle, where each camera independently applies the calculation method of FIG. 5, according to an embodiment of the present disclosure.

FIG. 6 is a top-view illustration of a multi-camera system for calculating a minimum distance between a robot and an obstacle, where each camera independently applies the calculation method of FIG. 5, according to an embodiment of the present disclosure. The method of FIG. 5 provides an effective and efficient calculation of minimum robot-obstacle distance, using only edge pixels in calculations when an unknown or dynamic object enters the robot workspace. However, with a single camera, occlusion can still present a problem, causing the camera to calculate an apparent (conservative, worst case) robot-obstacle distance which is much smaller than the actual 3D robot-obstacle distance.

FIG. 6 illustrates how the techniques of FIGS. 4 and 5 can be scaled up very simply to multiple cameras, thus increasing minimum distance accuracy in occlusion situations. A robot 600 operates in a workspace as discussed before. 3D cameras 610, 620 and 630 are arranged around the periphery of the workspace to provide images from different points of view. Because any dynamic objects (people, forklifts, etc.) entering the workspace are likely to be moving on the floor, the cameras 610-630 are typically aimed substantially horizontally—i.e., with the camera aim vector within +/−20° of horizontal and the camera image plane within +/−20° of vertical.

The cameras 610, 620 and 630 communicate, either by hardwire connection or wirelessly, with a computer 640. The computer 640 performs the image processing and minimum distance calculations and provides minimum distance results to a controller 650, which communicates with and controls the robot 600 in a manner known in the art. Alternately, the computer 640 may be eliminated, and the controller 650 receives the images from the cameras 610, 620 and 630 and performs the image processing and minimum distance calculations itself.

Each of the cameras 610, 620 and 630 has a field of view illustrated as a triangle emanating from the particular camera. The camera 610 has a field of view 612, the camera 620 has a field of view 622, and the camera 630 has a field of view 632. The fields of view 612, 622 and 632 are each labelled twice in FIG. 6 for clarity. A dynamic object 640 (a person) has entered the robot workspace, and is within all of the fields of view 612, 622 and 632. The object 640 creates an occlusion region downrange in the field of view from each of the cameras. An occlusion region 614 is created downrange of the object 640 in the field of view 612 (camera 610), an occlusion region 624 is created downrange of the object 640 in the field of view 622 (camera 620), and an occlusion region 634 (very small) is created downrange of the object 640 in the field of view 632 (camera 630).

Using the edge pixel distance calculation techniques discussed above with respect to FIGS. 4 and 5, a minimum robot-obstacle distance can be computed for each of the cameras 610, 620 and 630. Consider first the camera 610 and its field of view 612. The object 640 is nearer to the camera 610 than the robot 600 is to the camera 610. Therefore, there is an occlusion situation, and it must be assumed that the object 640 occupies the occlusion region 614. After the image processing steps described above relative to FIG. 5, the camera 610 computes an occlusion-based minimum robot-obstacle distance which is labelled as line 616.

Now consider the camera 620 and its field of view 622. The object 640 is nearer to the camera 620 than the robot 600 is to the camera 620. Therefore, there is an occlusion situation, and it must be assumed that the object 640 occupies the occlusion region 624. After the image processing steps described above relative to FIG. 5, the camera 620 computes an occlusion-based minimum robot-obstacle distance which is labelled as line 626.

Now consider the camera 630 and its field of view 632. The object 640 is further from the camera 630 than the robot 600 is from the camera 630. Therefore, there is not an occlusion situation, and the occlusion region 634 will not be used in the minimum distance calculations. Instead, for the camera 630, the actual 3D distances between edge pixels and robot control points will be computed and used in the minimum distance calculation. After the image processing steps described above relative to FIG. 5, the camera 630 computes an actual minimum robot-obstacle distance which is labelled as line 636.

After the calculations for all three of the cameras, a minimum robot-obstacle distance 616 exists for the camera 610, a minimum robot-obstacle distance 626 exists for the camera 620, and a minimum robot-obstacle distance 636 exists for the camera 630. At this point, the largest of the three minimum distances can safely be chosen as the actual value, because an actual 3D distance when viewed from different observation points is never less than the largest of those observations. This fact is manifested in the occlusion assumptions causing the minimum distances 616 and 626 to be artificially low. The minimum distance 636 is therefore selected as the most accurate value among the three cameras, and is the value that is used in robot collision avoidance motion planning computations by the controller 650.

Figure 7:
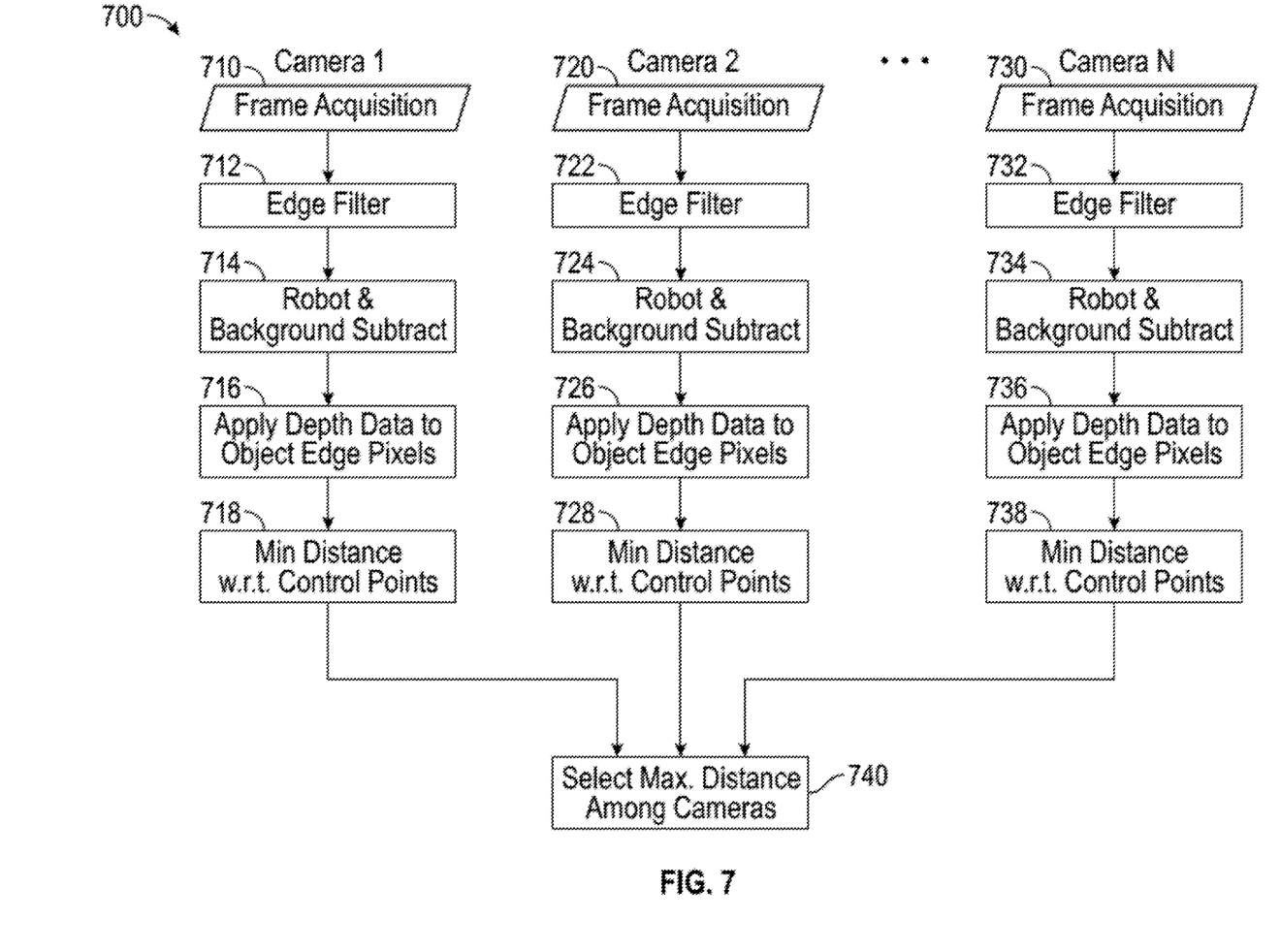
FIG. 7 is a flowchart diagram depicting a method for calculating a minimum distance between a robot and an obstacle using the multi-camera system of FIG. 6, according to an embodiment of the present disclosure.

FIG. 7 is a flowchart diagram 700 depicting a method for calculating a minimum distance between a robot and an obstacle using the multi-camera system of FIG. 6, according to an embodiment of the present disclosure. At step 710, an image frame is acquired from a first 3D camera identified as Camera 1. As discussed above, each of the cameras in FIG. 7 (and in FIG. 6 discussed above) provides a continuous stream of images at some frame rate, typically multiple frames per second. At box 712, edge filtering is applied to the image, resulting in an intermediate processed image having edge pixels only. At box 714, the robot and the static background are subtracted from the intermediate processed image from the box 712, resulting in an image containing only edges of dynamic objects, as discussed earlier. At box 716, depth data (from camera) is applied to the object pixels which remain in the dynamic object edge image. At box 718, after applying depth data to the dynamic object edge image, the minimum distance of the object edge pixels with respect to the robot control points is computed, either as a true 3D distance or based on the occlusion assumption as described above. The minimum distance computation at the box 718 provides the minimum distance value for the current image frame from Camera 1, which corresponds with the distance 616 depicted in FIG. 6.

At step 720, an image frame is acquired from a second 3D camera identified as Camera 2. The image from Camera 2 is processed at boxes 722-728, resulting in a distance computation at the box 728 which provides the minimum distance value for the current image frame from Camera 2, which corresponds with the distance 626 of FIG. 6.

At step 730, an image frame is acquired from a next 3D camera identified as Camera N. The image from Camera N is processed at boxes 732-738, resulting in a distance computation at the box 738 which provides the minimum distance value for the current image frame from Camera N. If the value of N is three, then the distance computed at the box 738 corresponds with the distance 636 of FIG. 6.

At box 740, the largest of the minimum distances computed at the boxes 718, 728 and 738 is selected as the most accurate representation of the minimum robot-obstacle distance for the current camera image time step. As discussed above with respect to FIG. 6, the minimum distances computed from some of the cameras may be artificially reduced due to the occlusion assumption, and the largest computed minimum distance from the multiple cameras is known to be the most accurate value.

The multi-camera method of FIG. 7 can be applied to any plural number of cameras, two or more. The greater the number of cameras, the more accurate the final minimum distance value (from the box 740) will be. It is to be noted that increasing the number of cameras in the method of FIG. 7 causes only a minimal increase in the computational intensity, as each camera's minimum distance is computed independently and in parallel, and only a simple largest-value selection is needed at the end (the box 740). This is in contrast to the prior art method shown in FIG. 3 and discussed above, where multiple cameras cause a 3D depth grid to be created, with complex computations involving the interrelationship between data from the different cameras.

Furthermore, the presently-disclosed technique of FIGS. 6 and 7 only requires that the cameras are calibrated relative to the robot workspace coordinate frame. The method of the present disclosure does not require the cameras to be calibrated relative to each other, which is not a trivial exercise, and which if not done precisely will cause errors in the depth grid illustrated in FIG. 3.

Figure 8A:
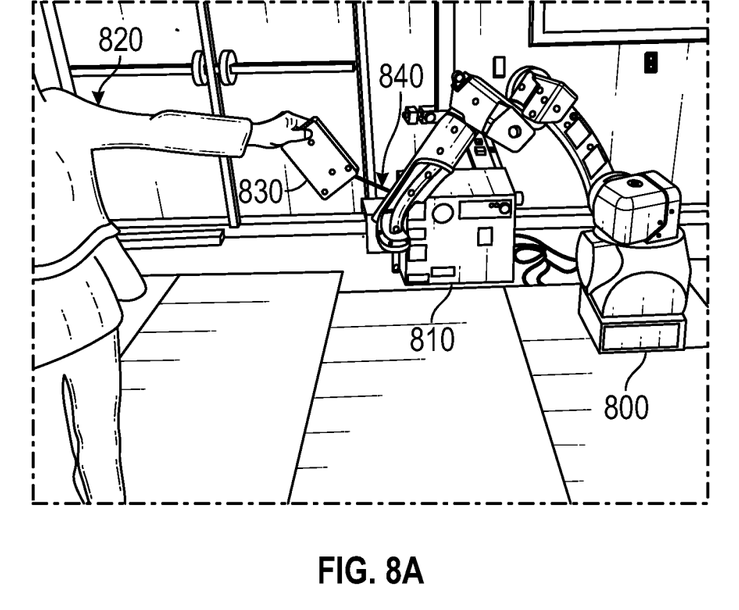
FIGS. 8A and 8B are illustrations a scene taken simultaneously from two cameras having different points of view, depicting how the system and method of FIGS. 6 and 7 are applied to determine a robot-obstacle minimum distance which correlates closely with actual measurements, according to an embodiment of the present disclosure.
Figure 8B:
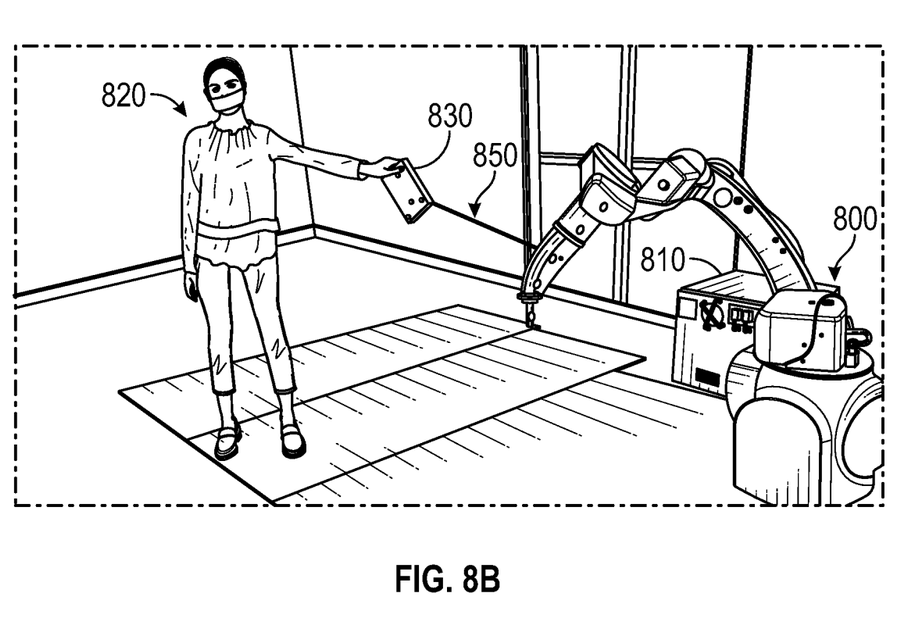

FIGS. 8A and 8B are illustrations of a scene taken simultaneously from two cameras having different points of view, depicting how the system and method of FIGS. 6 and 7 are applied to determine a robot-obstacle minimum distance which correlates closely with actual measurements, according to an embodiment of the present disclosure. FIG. 8A depicts a robot workspace image taken from a first camera, not shown. A robot 800 operates in the workspace, being controlled by a controller 810. Dynamic objects also exist in the workspace, including a person 820 holding an object 830. FIG. 8B depicts the robot workspace in an image taken from a second camera, not shown. The robot 800, the controller 810, the person 820 and the object 830 are also visible in the image in FIG. 8B. FIGS. 8A and 8B represent two images taken with different cameras at substantially the same instant—that is, the most recent camera time step where the two cameras are operating at the same frame rate, such that they can be processed using the method of FIG. 7.

FIGS. 8A and 8B illustrate a two-camera example of the system and method of FIGS. 6 and 7. In FIG. 8A, it is apparent from the positions of the person 820 and the robot 800 on the floor that the person 820 and the object 830 are closer to the first camera than the robot 800 is to the first camera. Thus, there is an occlusion situation, and the space "behind" the person 820 and the object 830, as viewed from the first camera, must be assumed to be occupied. Applying the image processing techniques of FIG. 4 and the method of FIG. 5 to the first camera, an occlusion-based minimum robot-obstacle distance is identified as indicated by a line 840. The minimum distance line 840 is measured in a plane parallel to the camera image plane.

In FIG. 8B, the person 820 and the object 830 are approximately the same distance from the second camera as the robot 800 is from the second camera. Thus, there is little if any occlusion. Applying the image processing techniques of FIG. 4 and the method of FIG. 5 to the second camera, a minimum robot-obstacle distance is identified as indicated by a line 850. Whether the minimum distance line 850 is measured in a plane parallel to the camera image plane or in actual 3D workspace coordinates, the length of the line 850 will be considerably greater than the length of the line 840.

Using the method of FIG. 7, the minimum robot-obstacle distance for the scene depicted in FIGS. 8A and 8B will be selected as the line 850 (FIG. 8B), which is the larger of the two minimum distances identified by the first camera and the second camera.

Figure 9A:
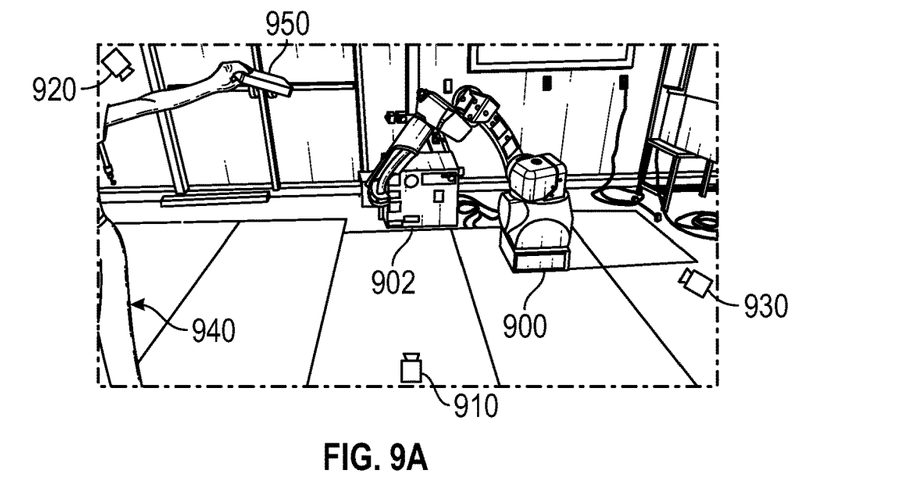
FIGS. 9A-9C are illustrations of three different obstacle scenarios and the resulting minimum distance calculations for each scenario using a three-camera system, according to an embodiment of the present disclosure.
Figure 9B:
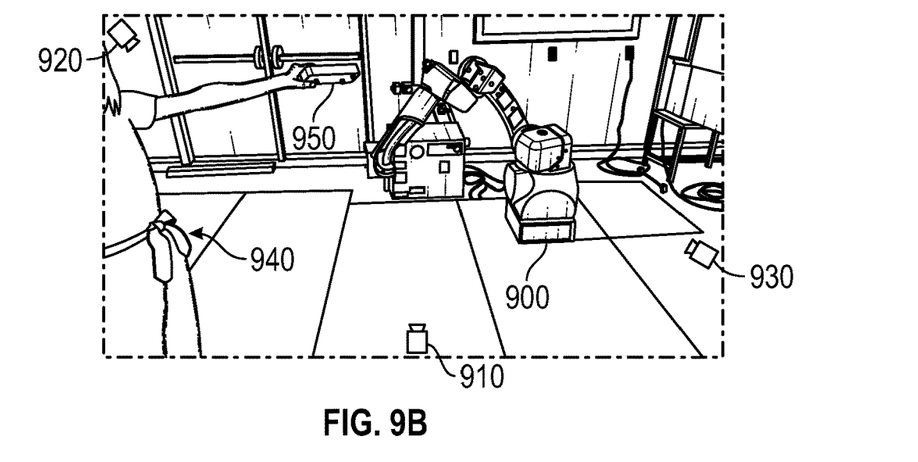
Figure 9C:
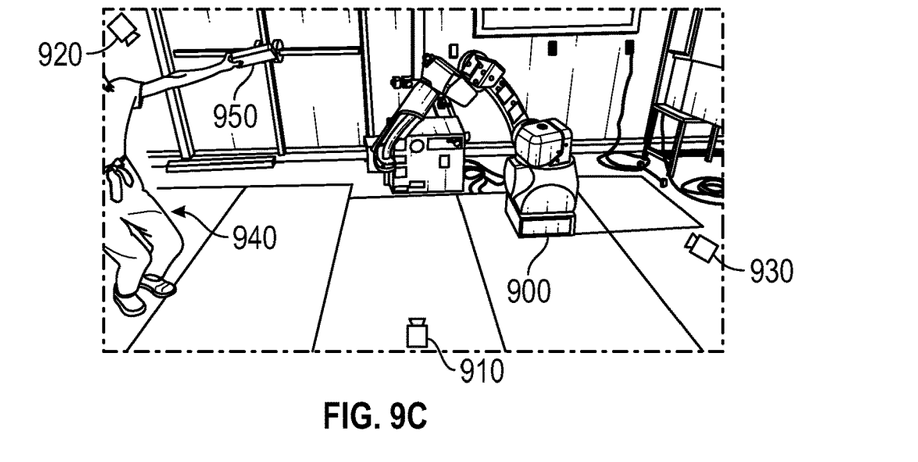

FIGS. 9A-9BC are illustrations of three different obstacle scenarios and the resulting minimum distance calculations for each scenario using a three-camera system, according to an embodiment of the present disclosure. Unlike FIGS.

8A/8B which are images of the same scene taken by different cameras at the same instant, FIGS. 9A-9C are illustrations of images of three different scenes from the same camera taken at different times, where the dynamic objects have moved to new locations from one scene to the next. Each of FIGS. 9A-9C will be discussed separately to illustrate how the relationship of obstacle location to camera location around the workspace affects each camera's computed minimum distance. In each scenario, distance values from actual system tests are listed for each camera.

A camera 910 is positioned at the "front center" of the workspace as depicted in FIGS. 9A-9C. That is, FIGS. 9A-9C are shown from the point of view of the camera 910. A camera 920 is positioned at the "back left" of the workspace, and a camera 930 is positioned at the middle of the right side of the workspace, as depicted in FIGS. 9A-9C. In each of FIGS. 9A-9C, a robot 900 with a controller 902 operates in the workspace. The robot 900 is depicted in the same pose in each of FIGS. 9A-9C. A person 940 is holding an object 950, where the person 940 and the object 950 represent potential obstacles to the robot 900, and are dynamic in that they can move into, out of and around the workspace.

In FIG. 9A, the person 940 is at the "front left" of the workspace and holding the object 950 with the person's arm essentially horizontal and protruding toward the center of the workspace. In this scenario, the camera 910 definitely has an occlusion situation, because the camera 910 is much closer to the object 950 than to the robot 900. However, there is a fair amount of lateral and vertical distance between the object 950 and the robot 900, so the camera 910 perceives an occlusion-based minimum robot-obstacle distance of about 69 centimeters (cm). The camera 920 also has an occlusion situation, because the camera 920 is closer to the object 950 than to the robot 900. Because of the occlusion assumption and the relative positions of the object 950 and the robot 900, the camera 920 perceives an occlusion-based minimum robot-obstacle distance of about 39 cm. The camera 930 does not have an occlusion situation, because the camera 930 is closer to the robot 900 than to the object 950. The camera 930 therefore computes a robot-obstacle minimum distance based on the actual 3D coordinates of an edge pixel of the object 950 and a control point on the robot 900. Using the actual 3D coordinates, the camera 930 computes a minimum robot-obstacle distance of about 82 cm. According to the method of FIG. 7, the largest of the three cameras' minimum distances is selected as the most accurate. Thus, the minimum distance of 82 cm from the camera 930 is selected. This minimum distance value compares favorably with a minimum distance of 81 cm measured for the scenario of FIG. 9A by a motion capture system which was set up in the actual workspace.

In FIG. 9B, the person 940 is at the front of the workspace, to the left of center, still holding the object 950 with the person's arm essentially horizontal and protruding toward the center of the workspace. In this scenario, the camera 910 still has an occlusion situation, because the camera 910 is much closer to the object 950 than to the robot 900. There is now less lateral and vertical distance between the object 950 and the robot 900 than in FIG. 9A, and the camera 910 perceives an occlusion-based minimum robot-obstacle distance of about 35 cm. The camera 920 also has an occlusion situation, because the camera 920 is closer to the object 950 than to the robot 900. Because of the occlusion assumption and the relative positions of the object 950 and the robot 900, the camera 920 also perceives a minimum robot-obstacle distance of about 35 cm. The camera 930 still does not have an occlusion situation, because the camera 930 is closer to the robot 900 than to the object 950. The camera 930 therefore computes a robot-obstacle minimum distance based on the actual 3D coordinates of an edge pixel of the object 950 and a control point on the robot 900, and that distance is about 83 cm. According to the method of FIG. 7, the largest of the three cameras' minimum distances is selected as the most accurate, that being the minimum distance of 83 cm from the camera 930. This minimum distance value compares favorably with a minimum distance of 89 cm measured by the motion capture system in the actual workspace for the scenario of FIG. 9B.

In FIG. 9C, the person 940 is along the left side of the workspace, toward the back, still holding the object 950 with the person's arm essentially horizontal and protruding toward the center of the workspace. In this scenario, the camera 910 may or may not have an occlusion situation, because the camera 910 is about the same distance from the object 950 and the robot 900. Using the image processing technique shown in FIG. 4 and the method of FIG. 5, occlusion will be assumed if the distance from the edge pixels of the object 950 to the camera is less than the distance from the control points on the robot arm to the camera. Using the appropriate calculation (either an occlusion-based projection or true 3D distance), the camera 910 calculates a minimum robot-obstacle distance of about 78 cm. The camera 920 definitely has an occlusion situation in FIG. 9C. Because of the occlusion assumption and the relative positions of the object 950 and the robot 900, the camera 920 perceives an occlusion-based minimum robot-obstacle distance of about 20 cm. The camera 930 still does not have an occlusion situation in FIG. 9C, because the camera 930 is closer to the robot 900 than to the object 950. The camera 930 therefore computes a robot-obstacle minimum distance based on the actual 3D coordinates of an edge pixel of the object 950 and a control point on the robot 900, and that distance is about 77 cm. According to the method of FIG. 7, the largest of the three cameras' minimum distances is selected as the most accurate, that being the minimum distance of 78 cm from the camera 910. This minimum distance value compares favorably with a minimum distance of 78 cm measured by the motion capture system in the actual workspace for the scenario of FIG. 9C.

The preceding discussion of FIGS. 9A-9C is provided to illustrate how the system and method of FIGS. 6 and 7 are applied in real world robot-obstacle situations, using three cameras to quickly and reliably determine accurate minimum distances. For the sake of discussion, if the person 940 and the object 950 were located at the right front of the workspace, the camera 920 would likely yield the largest (and most accurate) minimum distance.

As mentioned earlier, in FIGS. 9A-9C, the controller 902 may receive the images from the cameras 910, 920 and 930, and perform all of the image processing and distance calculation steps described above with respect to FIGS. 4-9. Alternately, a separate computer may be provided to perform all of the image processing and distance calculation steps, resulting in determination of whether dynamic objects are present in the workspace and if so, what the minimum robot-obstacle distance is. In either case, when dynamic objects are present, the minimum robot-obstacle distance is used by the controller 902 to determine whether collision avoidance maneuvers are necessary for the robot 900.

Throughout the preceding discussion, various computers and controllers are described and implied. It is to be understood that the software applications and modules of these computer and controllers are executed on one or more computing devices having a processor and a memory module. In particular, this includes a processor in each of the robot controller 650 and the computer 640 (if used) of FIG. 6 discussed above. Specifically, the processor in the controller 650 and/or the computer 640 (if used) is configured to perform the image processing steps on images from one or more cameras and compute a minimum robot-obstacle distance in the manner described throughout the foregoing disclosure. The same applies to the robot controllers depicted in FIGS. 4, 8 and 9, which may be used with or without a separate computer to perform the disclosed calculations.

As outlined above, the disclosed techniques for calculating a minimum distance to dynamic objects in a robot workspace provide significant advantages over prior art methods. The disclosed image processing steps to detect object edge pixels provide efficient identification of a minimum distance vector for a camera, whether occlusion is present or not. The combination of multiple cameras in a parallel computation enable the detection of an accurate minimum distance quickly and without the time-consuming and error-prone camera calibration and 3D depth grid computations of prior art methods.

While a number of exemplary aspects and embodiments of the method and system for calculating a minimum distance to dynamic objects in a robot workspace have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for calculating a minimum distance from a robot to obstacles in a workspace of the robot, said method comprising:
providing an image of the workspace from a three-dimensional camera;
performing edge filtering on the image, using a computer having a processor and memory, resulting in an edge image having only pixels which define edges of items in the workspace;
subtracting the robot and background items from the edge image, resulting in a dynamic object edge pixel image;
assigning a depth value to each pixel in the dynamic object edge pixel image to create a final image, where the depth value is taken from depth data in the image provided by the camera;
determining whether a number of pixels in the final image is greater than a predefined threshold;
computing a distance from each pixel in the final image to each of a plurality of control points on the robot when the number of pixels is greater than the threshold;
determining a minimum robot-obstacle distance from the computed distances; and
determining that no obstacles exist in the workspace when the number of pixels in the final image is less than or equal to the threshold.

2. The method according to claim 1 wherein subtracting the robot from the edge image includes computing a robot pose based on forward kinematics calculations using robot joint position data, transposing the robot pose to a position and orientation of each robot arm in an image coordinate frame, and subtracting each robot arm from the edge image.

3. The method according to claim 1 wherein subtracting background items from the edge image includes providing a previously-taken background reference image known to have no dynamic objects in the workspace, performing edge filtering on the background reference image to create a background reference edge image, and subtracting the background reference edge image from the edge image.

4. The method according to claim 1 further comprising hole filling the depth data before assigning a depth value to each pixel, including assigning a depth value to pixels in the image which are missing depth data, where the depth value is assigned based on a pixel within a predefined neighboring distance which has a depth value nearest the camera.

5. The method according to claim 1 wherein computing a distance from each pixel in the final image to each of a plurality of control points on the robot includes performing an occlusion check, where the occlusion check is positive when a distance from the camera to the pixel is less than a distance from the camera to the control point.

6. The method according to claim 5 wherein, when the occlusion check is positive, computing the distance from the pixel to the control point as a distance projected onto a plane parallel to a camera image plane.

7. The method according to claim 5 wherein, when the occlusion check is not positive, computing the distance from the pixel to the control point as an actual three-dimensional distance using a sum of the squares of the differences in coordinates formula.

8. The method according to claim 1 wherein each of the control points on the robot is defined at a point on an exterior surface of a robot arm, along a kinematic axis of a robot arm, or at a joint center.

9. The method according to claim 1 further comprising providing a simultaneous image of the workspace from one or more additional three-dimensional cameras, where each of the cameras is placed at a different location around a periphery of the workspace, determining a minimum robot-obstacle distance from the image from each of the additional cameras, and selecting a maximum of the determined minimum robot-obstacle distances to use in robot motion programming.

10. The method according to claim 1 further comprising using the minimum robot-obstacle distance by a robot controller in a collision avoidance robot motion planning algorithm.

11. The method according to claim 10 wherein the computer is the robot controller.

12. A method for calculating a minimum distance from a robot to obstacles in a workspace of the robot, said method comprising:
providing a simultaneous image of the workspace from each of a plurality of three-dimensional (3D) cameras;
performing edge filtering on each of the images, using a computer having a processor and memory, resulting in an edge image having only pixels which define edges of items in the workspace;
subtracting the robot and background items from each of the edge images, resulting in a dynamic object edge pixel image;
assigning a depth value to each pixel in each of the dynamic object edge pixel images to create a final image, where the depth value is taken from depth data in the image provided by the camera;
when a number of pixels in each of the final images is greater than or equal to a predefined threshold, computing a distance from each pixel in the final image to each of a plurality of control points on the robot;
determining a minimum robot-obstacle distance for each of the cameras from the computed distances;

selecting a maximum of the determined minimum robot-obstacle distances to use in robot motion programming; and when the number of pixels in all of the final images is less than the predefined threshold, determining that no obstacles exist in the workspace.

13. The method according to claim 12 wherein computing a distance from each pixel in the final image to each of a plurality of control points on the robot includes performing an occlusion check, where the occlusion check is positive when a distance from the camera to the pixel is less than a distance from the camera to the control point, and when the occlusion check is positive, the distance from the pixel to the control point is computed as a distance projected onto a plane parallel to a camera image plane.

14. A system for calculating a minimum distance from a robot to obstacles in a workspace of the robot, said system comprising:
   one or more three-dimensional (3D) cameras each providing a simultaneous image of the workspace; and
   a computer in communication with the one or more cameras, said computer having a processor and memory configured for;
   performing edge filtering on each of the images, resulting in an edge image having only pixels which define edges of items in the workspace;
   subtracting the robot and background items from each of the edge images, resulting in a dynamic object edge pixel image;
   assigning a depth value to each pixel in each of the dynamic object edge pixel images to create a final image, where the depth value is taken from depth data in the image provided by the camera;
   when a number of pixels in each of the final images is greater than or equal to a predefined threshold, computing a distance from each pixel in the final image to each of a plurality of control points on the robot;
   determining a minimum robot-obstacle distance for each of the cameras from the computed distances;
   selecting a maximum of the determined minimum robot-obstacle distances to use when more than one camera is used; and
   when the number of pixels in all of the final images is less than the predefined threshold, determining that no obstacles exist in the workspace.

15. The system according to claim 14 wherein the computer is further configured for hole filling the depth data before assigning a depth value to each pixel, including assigning a depth value to pixels in the image which are missing depth data, where the depth value is assigned based on a pixel within a predefined neighboring distance which has a depth value nearest the camera.

16. The system according to claim 14 wherein computing a distance from each pixel in the final image to each of a plurality of control points on the robot includes performing an occlusion check, where the occlusion check is positive when a distance from the camera to the pixel is less than a distance from the camera to the control point, and when the occlusion check is positive, the distance from the pixel to the control point is computed as a distance projected onto a plane parallel to a camera image plane.

17. The system according to claim 14 wherein the one or more cameras are located around a periphery of the workspace and the image from each camera is taken with the camera aimed in a substantially horizontal direction.

18. The system according to claim 14 further comprising a robot controller in communication with the computer and configured to use the minimum robot-obstacle distance in a collision avoidance robot motion planning algorithm.

19. The system according to claim 14 wherein the computer is a robot controller configured to use the minimum robot-obstacle distance in a collision avoidance robot motion planning algorithm.

20. A method for calculating a minimum distance from a robot to obstacles in a workspace of the robot, said method comprising:
   providing a simultaneous image of the workspace from each of a plurality of three-dimensional cameras;
   performing edge filtering on the image from each of the cameras, using a computer having a processor and memory, resulting in an edge image for each of the cameras having only pixels which define edges of items in the workspace;
   subtracting the robot and background items from the edge image for each of the cameras, resulting in a dynamic object edge pixel image for each of the cameras;
   assigning a depth value to each pixel in the dynamic object edge pixel image to create a final image for each of the cameras, where the depth value is taken from depth data in the image provided by the corresponding camera;
   computing a distance from each pixel in the final image for each of the cameras to each of a plurality of control points on the robot;
   determining a minimum robot-obstacle distance from the computed distances for each of the cameras; and
   selecting a maximum of the determined minimum robot-obstacle distances to use in robot motion programming.

* * * * *